(12) United States Patent
Lubbers et al.

(10) Patent No.: US 7,333,971 B2
(45) Date of Patent: Feb. 19, 2008

(54) HELPSET BUILD SYSTEM AND METHOD

(75) Inventors: Jedidia Lubbers, Oregon House, CA (US); H. David Goering, Newton, KS (US)

(73) Assignee: Oracle International Corporation, Redwood Shores, CA (US)

(*) Notice: Subject to any disclaimer, the term of this patent is extended or adjusted under 35 U.S.C. 154(b) by 348 days.

(21) Appl. No.: 10/771,655

(22) Filed: Feb. 3, 2004

(65) Prior Publication Data

US 2005/0192917 A1 Sep. 1, 2005

(51) Int. Cl.
*G06F 17/30* (2006.01)

(52) U.S. Cl. .................. 707/1; 707/100; 707/104.1; 715/517; 715/523

(58) Field of Classification Search ............ 707/1, 707/100, 104.1; 715/517, 523, 709, 854; 717/117, 145
See application file for complete search history.

(56) References Cited

U.S. PATENT DOCUMENTS

| | | | | |
|---|---|---|---|---|
| 6,307,544 | B1 * | 10/2001 | Harding | 715/709 |
| 6,476,833 | B1 * | 11/2002 | Moshfeghi | 715/854 |
| 7,024,658 | B1 * | 4/2006 | Cohen et al. | 717/117 |

OTHER PUBLICATIONS

Sun Micro Systems, JavaHelp System User's Guide, Jun. 2002, pp. 1-97.*
Kevin Lewis, Creating Effective JavaHelp, Jun. 2000, pp. 1-16.*
Oracle, Oracle Help for Java: Full-Featured Help for Java Applications, 2001, pp. 1-11.*
Rintjema et al., Creating an HTML Help System for Web-based Products, pp. 227-233.*

* cited by examiner

*Primary Examiner*—Tony "Hassan" Mahmoudi

(57) ABSTRACT

A system and method for automatically building helpsets is disclosed. There are a number of features that are provided by the present invention, including recursive building of subhelpsets, running a variety of scripts (e.g., post-processing scripts), creating topic identification (ID) map files, creating index files (e.g., XML index files), and creating full-test-search index files. Helpset building can be automatically initiated (e.g., at predetermined or scheduled times, in response to trigger events, etc.). Arguments or "parameters" (e.g., feature option selections, output control indications, etc,) can be passed on a command line or by an initialization file to initiate helpset building. The helpsets can be built based on information in standard help source files. Referenced files are included in a final output and files that are not referenced are not included helping to keep a full-test-search index file "clean" and final file output (e.g. JAR) footprint minimized.

19 Claims, 6 Drawing Sheets

HELPSET BUILD SYSTEM AND METHOD

FIELD

The present invention relates generally to providing help information in computer systems. More particularly, the present invention relates to a system and method for building helpsets.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. These advantageous results are often realized through a variety of extensive and complex applications running on the electronic systems. However, it is often difficult for average end users to have an extensive understanding and knowledge of the features provided by the applications. Users typically find it helpful to be able to access assistance or help on various activities and explanations on how to perform a variety of operations available in a typical application.

The assistance or help is generally made available to a user by a help "mechanism" (e.g., a help system). One example of a help mechanism is "Java Help," which is an industry standard help system that is platform independent, or "Oracle Help for Java," which is an extension of "Java Help." The information contained in a help system is usually organized into helpsets. Helpsets can include a number of different files such as Hyper-Text Markup Language (HTML) source files, image files, style sheets, and Extensible Markup Language (XML) based control files. Typically software applications have associated helpsets that can provide assistance information to a user in a stand alone system and/or online via a network (e.g., the Internet). The "help" can be presented or "rendered" to a user via a variety of mechanisms. For example, a help (rendering) engine can be used by a software application to render an online helpset in a particular environment (e.g., in a Java application, or online).

In addition to providing basic help information, help systems also include a number of features to assist a user in navigating the help information and find instructions for performing a specific desired task. For example, helpsets often include help files and control files. The help files and control files typically permit a user to interact with a number of help system features including table of content features, index features, and search features. For example, help systems associated with simple text editor applications usually provide a user with information on how to perform a specific edit action. The user can typically use a search function based on some chosen keywords to find the information and/or the user can also typically use a keyword index or a table of contents to find the information.

Helpsets are typically developed as part of documentation activities for the associated applications. There are typically three phases in helpset related document production, including (1) authoring; (2) helpset management; and (3) packaging or "building" (i.e., creation of output, such as jar files). Traditionally a number of these activities are manually performed. For example, manually editing map files, manually creating a full-test-search index, etc. The manual activities required to build traditional helpsets is usually very resource intensive and complicated. Modern applications are typically very extensive and helpset document production is often a team effort. Coordinating between different authors is typical difficult for traditional approaches to helpset building that rely on significant manual interaction. For example, if two different authors attempt to build separate table of contents manually, integrating them is usually very difficult.

Attempts at using common traditional help authoring tools to build helpsets are often inefficient. Several separate tools requiring extensive knowledge and manual coordination usually have to be utilized in order to complete the entire help "mechanism" or system. This tends to result in a number of problems associated with coordination issues. For example, there tend to be a number of problems in the control files (e.g., bugs in full-test-search functions) and there are often a number of quality concerns (e.g., HTML files can include a number of unnecessary comments and/or tags). Traditional attempts at addressing such problems (e.g., manually writing scripts) are labor intensive and typically require multiple steps including decompressing files (e.g., un-jarring the files), fixing problems (e.g., program bugs), and recompressing the files. Coordination of helpset information (e.g., coordination of sub-helpsets) is usually a difficult task.

SUMMARY OF THE INVENTION

A system and method for automatically building helpsets is disclosed. Present invention helpset build system and method are compatible with a variety of help-authoring tool schemes and mechanisms. The helpset build systems and methods facilitate avoidance of problems and bugs in helpsets that are undesirable. There are a number of features that are provided by the present invention, including recursive building of subhelpsets, running a variety of scripts (e.g., post-processing scripts), creating topic identification (ID) map files, creating index files (e.g., XML index files), and creating full-test-search index files. Helpset building can be automatically initiated (e.g., at predetermined or scheduled times, in response to trigger events, etc.). Arguments or "parameters" (e.g., feature option selections, output control indications, etc,) can be passed on a command line or by an initialization file (e.g., a file with an .ini extension) to initiate helpset building. The helpsets can be built based on information in standard help source files. Referenced files are included in a final output and files that are not referenced are not included helping to keep a full-test-search index file "clean" and final file output (e.g. JAR) footprint minimized.

In one embodiment, several steps are performed during a helpset build process. For example, arguments passed on a command line or by an initialization are verified. The source files are parsed and subhelpset indications are identified. Files associated with the primary helpset and related subhelpsets are copied from a source directory to a temporary directory. From the files in the temporary directory various control files are generated (e.g., index files, map files, full-test-search files, etc.). Automatic modification of the files can also be performed, including internal and external post-processing (e.g., insertion of script tags, insertion of meta tags, manipulation based on the tags, etc.). The creation of the helpset files can be performed in a recursive fashion on identified subhelpsets. When the helpsets are built final helpset files are placed in an output directory.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Figure 1A:
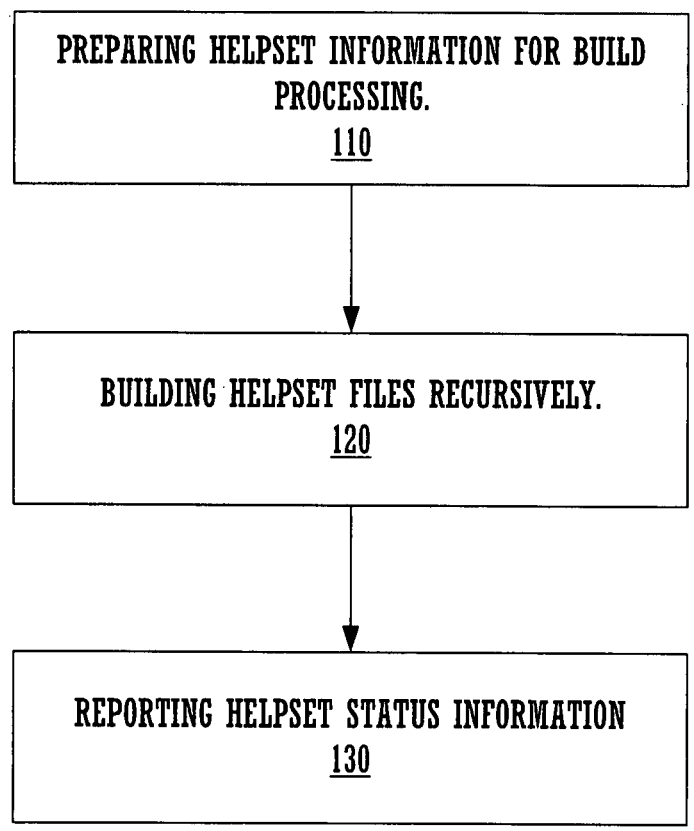
FIG. 1A is a flow diagram of the help build tool method in accordance with one embodiment of the present invention.

FIG. 1A is a flow chart of helpset build method 100 in accordance with one embodiment of the present invention. Helpset build method 100 enables helpsets to be automatically built. Helpset build method 100 facilitates avoidance of various problems and bugs that are undesirable (e.g., copying of unnecessary files) and is compatible with a variety of help-authoring tool schemes and mechanisms. There are a number of features that helpset build method 100 can provide, including recursive building of subhelpsets, running a variety of scripts (e.g., post-processing scripts), creating topic identification (ID) map files, creating index files (e.g., XML index files), and creating full-test-search index files. In one embodiment, referenced files are included in a final output and files that are not referenced are not included. Preventing the inclusion of non-referenced files helps keep full-test-search index files "clean" and final file output (e.g. JAR) footprints minimized.

In step 110, helpset related information is prepared for build processing. An indication of helpset file names (e.g., a list of file names with a .hs extension) is received and a help project file indication (e.g., a file with a .hhp extension) associated with the helpset file is retrieved. The help project file includes indications (e.g., a text file list) of source files related to the helpset file. In one exemplary implementation, a copy of the source files is gathered in a temporary directory.

In one embodiment of the present invention, command-line arguments are verified as part of step 110 preparations. Verifying command-line arguments can include checking that designated directories exist and ensuring that selected option pairs are mutually exclusive. If there are potential problems with the arguments, the user can be notified before the main build procedure is undertaken, permitting avoidance of wasted program resources (e.g., run-time and/or processing activity) due to inaccurate or incompatible arguments. Optionally, a designation is provided for relatively minor incompatibilities (e.g., a missing image file) that would not necessarily result in a complete stop of the program run. In an alternate embodiment, an initiation file (e.g., a file with a .ini extension) is parsed and verified.

In step 120, helpset files are built automatically. In one embodiment, the source files are parsed and related helpsets are identified and a recursive helpset build process is performed for the helpsets. For example, subhelpsets are identified and recursively built. In one exemplary implementation, recursively building the helpsets includes building control files automatically, selectively copying help file information (e.g., reference image files, style sheet files, etc.), and modifying the help file and control file contents automatically. The selection of copied information can be indicated by results of the parsing. The modification of the help file and control file contents can include reading a file and rewriting the file with different and/or added content.

For example, modifying of the help files and control files automatically can be based upon meta-tag indications parsed from the source files.

In step 130, helpset status related information is reported. In one embodiment of the present invention, a set of detailed reports is created with a listing of peculiarities for a run. The reports can be provided in a tiered hierarchy structure in which a top-level status report is provided with the ability to "drill" down into more explicit details if desired. For example, the reports can provide a variety of status related information including various error conditions, warnings, missing file lists, missing image lists, exit status of scripts that ran during a build process and various other statistical information related to a build run.

Figure 1B:
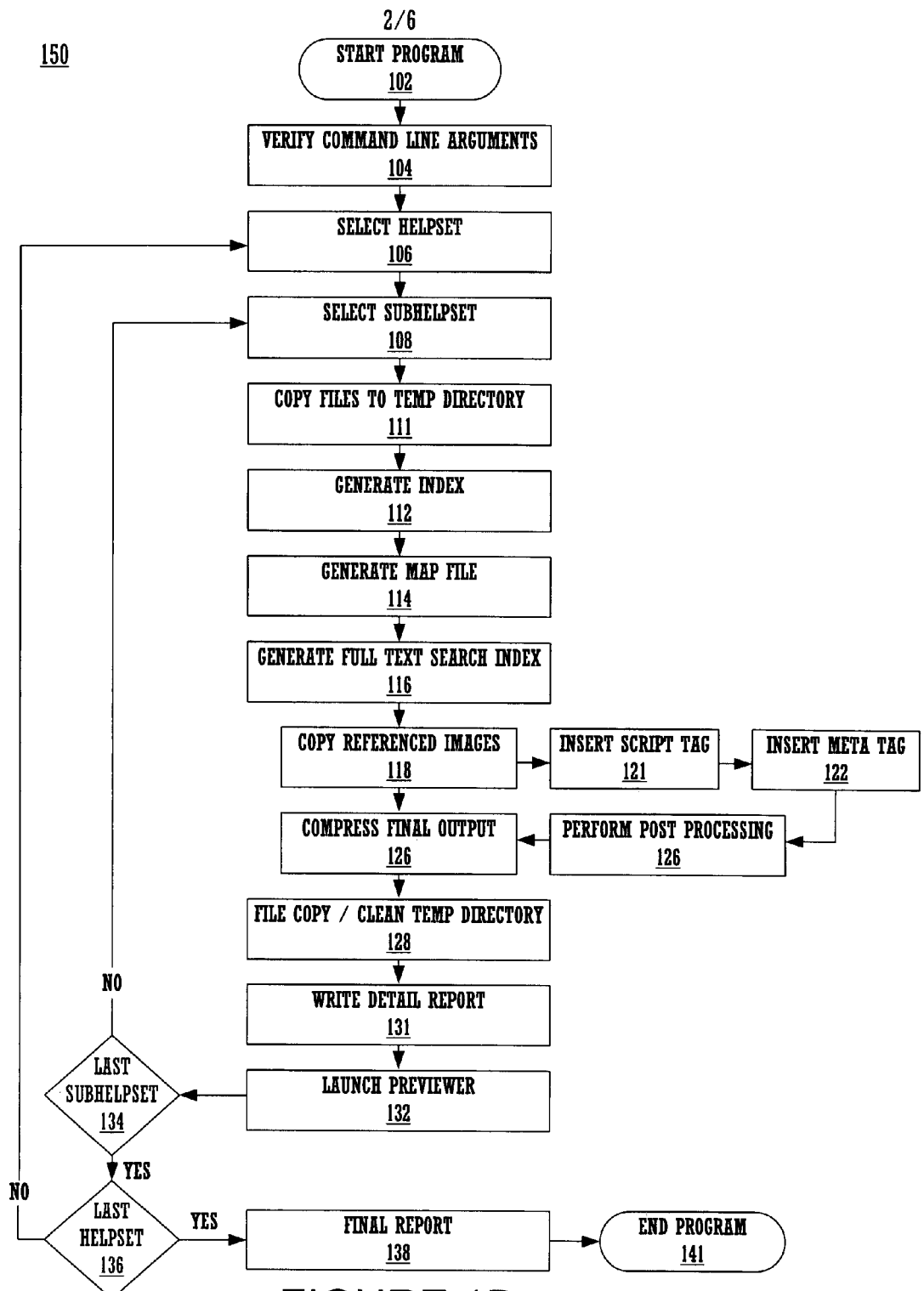
FIG. 1B is a flow diagram of the help build tool method in accordance with another embodiment of the present invention.

Referring now to FIG. 1B, a more detailed flow diagram of a help build tool method 150 according to one embodiment of the present invention is shown. Help build tool method 150 can be implemented by a program, which can include software instructions that can be executed on a computer system. In one embodiment of the present invention, helpset building utilizes a directory structure that includes a source directory, an output directory and a temporary directory used during the process.

The help build method begins at step 102 and starts the instructions or program. The program can be started or invoked in a variety of ways, including a manual start or an automatic start. The automatic start can be based on scheduled times and/or certain triggering events. Further, the program can be used in a stand-alone fashion or be integrated in an overall build system. Also, the program can be invoked in a source-control environment. This can automate the output (e.g., jar file) creation by integrating help-document building (e.g., doc.build) with product building.

The program can run on a command line to build helpsets and command-line arguments can be verified in step 104. The present invention is readily implemented for verification of a variety of arguments. For example, command-line arguments can include an output directory indication, an indication of a destination directory for reports, the location of environment help (e.g., Oracle Help) to be utilized, an indication whether a helpset is JARed up and/or other locations or settings. Specific settings can similarly include a variety of items. For example, settings can include designations for the compression of files, topic index creation, creating a map file from "meta" tags in the topics, identification of post-processing files along with associated arguments, viewing of output via a previewer, insertion of script tags for CSS, and/or optional file inclusion. In one exemplary implementation of a command-line parameter, a destination directory can be designated by:

destination_dir=C: \bldsys\test\output

In another exemplary implementation in which an Oracle Help product version is utilized, the directory can be designated:

oracle_help_version=4.1.11.

The command-line instructions can be included in a batch type file or an initialization (*.ini) type file as an alternative.

A helpset selection function is performed in step 106. In one embodiment, a user interface is provided to permit a user to participate in the helpset selection. The helpset selection function can also initiate implementation of a "for loop," where the main part of the program builds a single helpset.

Similarly, the program supports selection of subhelpsets in step 108. The selection of subhelpsets can be performed automatically and can include checking to see if subhelpsets exist and if there is a subhelpset indication within the main helpset. The selection of subhelpsets can be implemented as a "for loop" facilitating the "recursive" features of the helpset building to be implemented. Each helpset can contain one or more pointers to another one or more helpsets, which can contain one or more pointers to another one or more helpsets, and so on. The recursive features of the present invention facilitate appropriate building of each helpset and its related helpsets (e.g., subhelpsets). This can allow multiple developers to author different helpsets that can be integrated into a primary or "master" helpset. Thus, a master helpset can have references to other helpsets.

The program can proceed to step 111 and copy files to a temporary directory. In one exemplary implementation the files can be copied from a source directory to a temporary directory. The helpsets are built and stored in the temporary directory during the build process.

An index is automatically generated in step 112. Automatic indexing is a feature where if specific HTML tags have keywords or "in topic" index keywords therein, an index XML control file is automatically generated. In this approach, the keywords can be specified relatively easily in an HTML editor and the associated control files can then be generated automatically "on the fly."

In one embodiment of present invention, in a similar manner table of content (TOC) files are automatically built on the fly. In addition multiple different tables of contents, or those from various subhelpsets, for example, can be integrated "in line."

In step 114, a map file is generated. In one embodiment of the present invention, a topic identification (ID) is used by a program to instruct a help system to call a particular help topic (e.g., particular helpset). Mapping files for mapping the topic IDs to the appropriate file names are generated in an automatic fashion. In one exemplary implementation, the map files can be based on specific parsed HTML meta tags that include a particular topic ID the file is mapped. Alternatively, the topic ID can based on a convention (e.g. correspond to a file name).

A full-test-search index is generated at step 116. A full-test-search index is a binary file that allows the help rendering engine to interact with the user to conveniently locate particular text.

In step 118 an additional copy selection function is performed. Checks for missing images or other possible errors can be performed during the copy selection function. For example, source files can be parsed and referenced image files (e.g., foo.gif) can be selected for copying from the temporary directory. Further, images that are referenced, but not found, are noted in one of the build report sections. The same procedure can be performed on the style sheets, including Cascading Style Sheets (CSS), Java Scripts (JS), and/or HTML. However, those images, files, or links that are not referenced are not copied to for inclusion in output folders and do not unnecessarily occupy storage space. The resulting build and output "footprint" is efficient and does not include extraneous files.

Actual modification of files can take place in and script tag can be inserted in step 121, meta tags inserted in step 122, and post-processing performed in step 124, based on a script-tag designation. An optional tag can insert a javascript call in the HTML source, for example. The output resulting from the build tool involves a parsing of HTML files. For example, parsing for "Meta Tags" for building the mapping files and/or certain control files, including the index.

Some map files can based on conventions and others can be specified in a "meta tag" in HTML in accordance with step 122. Parsing in accordance with the meta tags allows for a new map file to be created. Developers do not have to necessarily manually maintain text files with outdated information. Post-processing step 124 can then call other scripts to execute on the file set. This can be done prior to compressing the final helpsets file in step 126. As noted above, one of the command line and/or "ini" file designations can indicate the optional compressing or "jarring" of the final output file.

In step 128, the temporary directory is cleared and a detailed report is written in step 131. This report can include data about the run, such as a top level status report, missing file lists, missing image file lists, exit status of scripts run during the build, and other run statistics.

A previewer can be an optionally launched in step 132. In step 134 a branch decision branch if the loop is done processing the last subhelpset. If more subhelpset building is indicated the process proceed back to step 108. The overall system can build from associated or subhelpsets in a recursive fashion and place the results into an output file (e.g., a compressed or JARed output file). The recursive feature helps avoid opening up individual output files in order to add in additional associated helpsets and if the final output files are compresses the recursive nature of the present invention can also help avoid decompressing and recompressing that might otherwise be required. If there are no more subhelpsets to be build the process proceeds to step 136.

In step 136 a decision is made if the last helpset is encountered. If that's false, the flow can go back to step 106. If the last helpset is not encountered the process returns to step 106. If the last helpset is encountered the process proceeds to step 138. In step 138 a final report is created and the build process program is ended in step 141.

The build tool can also parse or read through the HTML files to determine if the HTML syntax is correct or if perhaps there are missing images, files, style sheets, or broken links. The results of the parsing and examination can be included in one or more reports that indicate the potential problems.

Other features of the embodiments include allowing for a run-time conversion of older "legacy" files into a proper or updated format. This can facilitate a migration from older help build tools. Further, this approach does not make unwanted file edits, such as rewriting files, changing tables, HTML code, or Topic IDs. There are also typically no backslashes added to paths in the control file or other such common bugs when using this approach.

Figure 2:
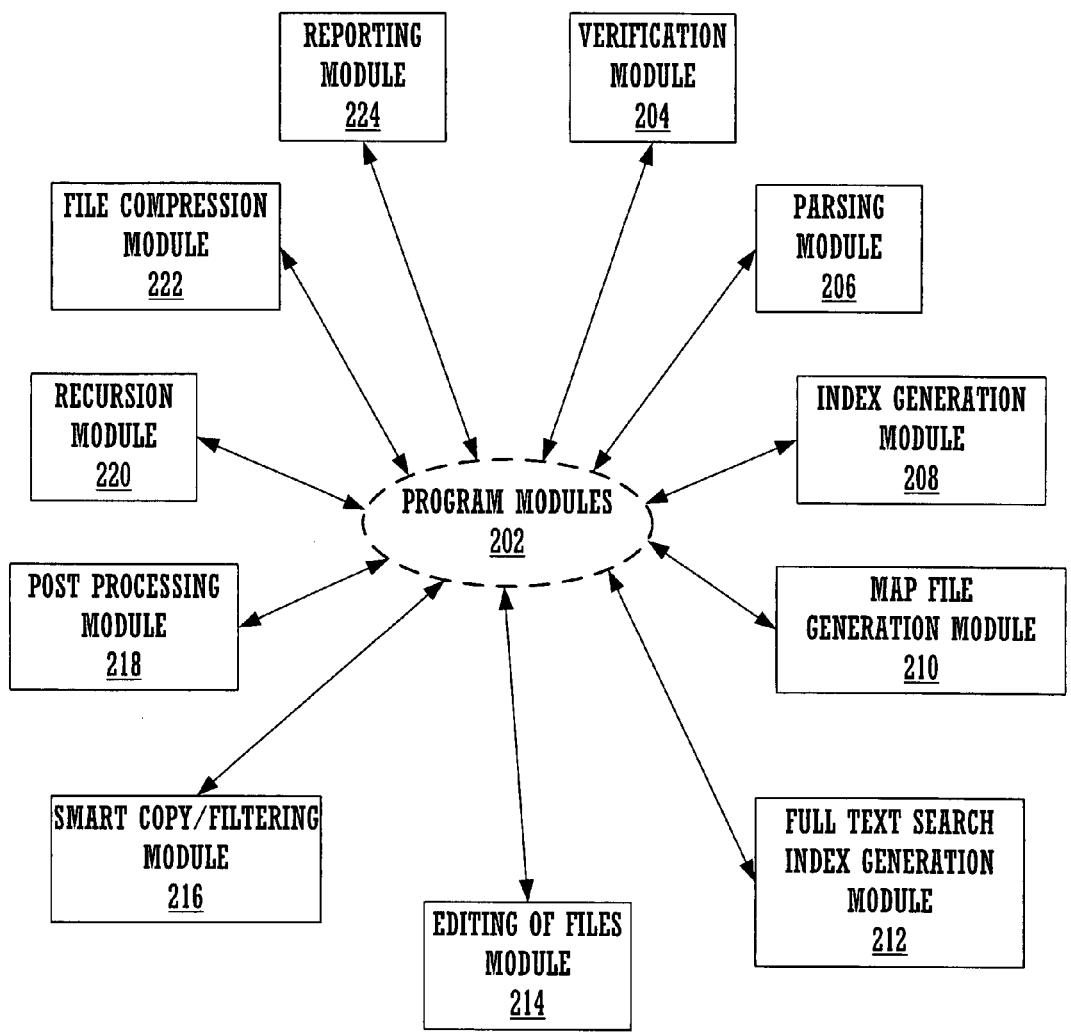
FIG. 2 is a block diagram of the program modules for implementing a help build tool in accordance with one embodiment of the present invention.

Referring now to FIG. 2, a block diagram of possible program modules for implementing a help build tool in accordance with one embodiment of the present invention and indicated by the general reference character 200. This diagram represents a conceptualization of some possible functional modules that can be used in a computer executable program embodiment, including program modules 202.

Verification module 204 can verify arguments passed for a program run. In one embodiment of the present invention, verification module 204 performs verification in accordance with step 104.

Parsing Module 206 can parse various information utilized in building a helpset. For example, Parsing Module 206 can parse an "HS" file that describes a *helpset. Parsing module 206 can parse the source files to identify related helpsets (e.g., subhelpsets) a recursive helpset build process is performed for the helpsets. Parsing module 206 can also parse meta-tag indications of desired helpset file modifications.

Index generation module 208 can provide a keyword index. In one embodiment, index generation module 208 implements index generation in accordance with step 112. The keyword index can be utilized in the automatic construction of a table of contents.

Map file generation module 210 can map topic identifications (IDs) to appropriate (e.g., corresponding) file names. Map file generation module 210 can direct implementation of step 114.

Full-test-search index generation module 212 provides a full-test-search index. In one exemplary implementation, full-test-search index generation module 212 can call to other resources to assist with full-test-search index generation (e.g., Oracle Help for Java technology). Full-test-search index generation module 212 can direct implementation of step 116.

File editing module 214 can implement file editing, including the addition of HTML syntax to the files as a user option, for example. In one embodiment, file editing module 214 directs performance of script-tag insertion (e.g., step 121), meta-tag insertion (e.g., 122), and post-processing operations (e.g., step 124). In one embodiment, the present invention includes separate post-processing module 218 for directing performance of post process operations, including execute and/or call additional scripts.

Smart filter copying module 216 controls copying of files associated with helpset building. For example, it can control the referenced image files that get copied over to the output folder as well as the blanket copying of files to the temporary directory. In one embodiment, smart filter copying module directs selective copying of referenced image files in which referenced image files are copied and non-referenced image files are not copied. In one exemplary implementation, smart filter copying module directs implementation of steps 111, 118, and 126.

Recursion module 220 directs recursive helpset build operations. For example, recursion module 220 can direct operation to include subhelpsets or other referenced helpsets in a helpset build. This recursive function can span the other modules. In one exemplary implementation, recursion module 220 can direct implementation of steps 106, 108, 134 and 138.

File compression module 222 can compress (e.g., JAR) the final output helpset build product file. Reporting module 224 can report the help build tool results.

Figure 3:
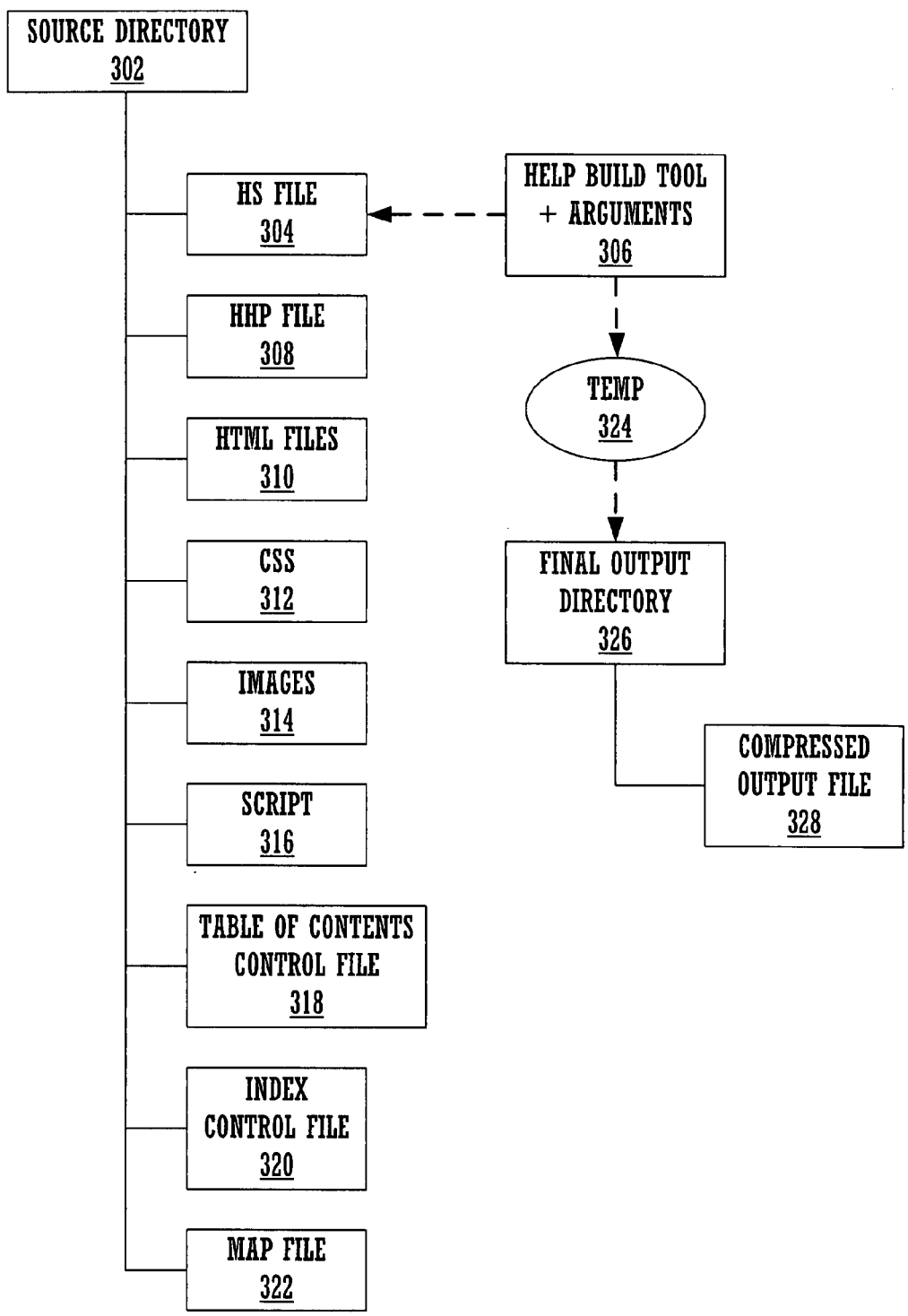
FIG. 3 is a block diagram of a directory structure utilized by a help build tool in accordance with on embodiment of the present invention.

Referring now to FIG. 3, a block diagram of a directory structure for the help build tool according to an embodiment is shown and indicated by the general reference character 300. This directory structure diagram can show a basis for a recursion feature of the embodiment. The files need not be located according to a strict directory hierarchy. In fact, one or more of the files may be located elsewhere on a network, for example. Also, not all of the files as shown are required to build a particular helpset, but rather represent an example structure including a particular set of files. In FIG. 3, source directory 302 can include a helpset control file HS file 304, which can be an XML type file, for example. In HS file 304, locations of other helpset files and/or subhelpsets or other like files can be obtained. Such other locations can also contain a directory structure similar to the HS file 304 example case.

In addition to HS file 304, the structure can include locations and/or pointers for HHP file 308, HTML files 310, CSS files 312, image files 314, script files 316 (e.g., JS), table of contents control file 318, index control file 320, and map file 322, for example. The help build tool and arguments file 306 can specify which helpset is to be built. As described above, a temporary directory temp 324 can include a variety of files. For the recursive functioning, a list of helpsets (e.g., subhelpsets) to be built can be put together at the beginning of the flow. Each of these helpsets can be put into temp 324 and appropriate actions can then be performed, as described above. In one embodiment, the helpsets remain in temp 324 until the entire helpset is built, including the completion of the subhelpset builds.

Each pass through to build a helpset can result in added files to temp 324. When the helpsets have been built the process proceeds to place the files in final output directory 326. Included in the output are the generated files, such as a binary index, generated map files, and/or a generated index. In the example shown in FIG. 3, the output is compressed or jarred and a single compressed output file 328 remains instead of a directory of multiple files. In one exemplary implementation, the compression or jarring of the output file is done once at the highest level helpset after a hierarchy of helpsets has been built.

Figure 4A:
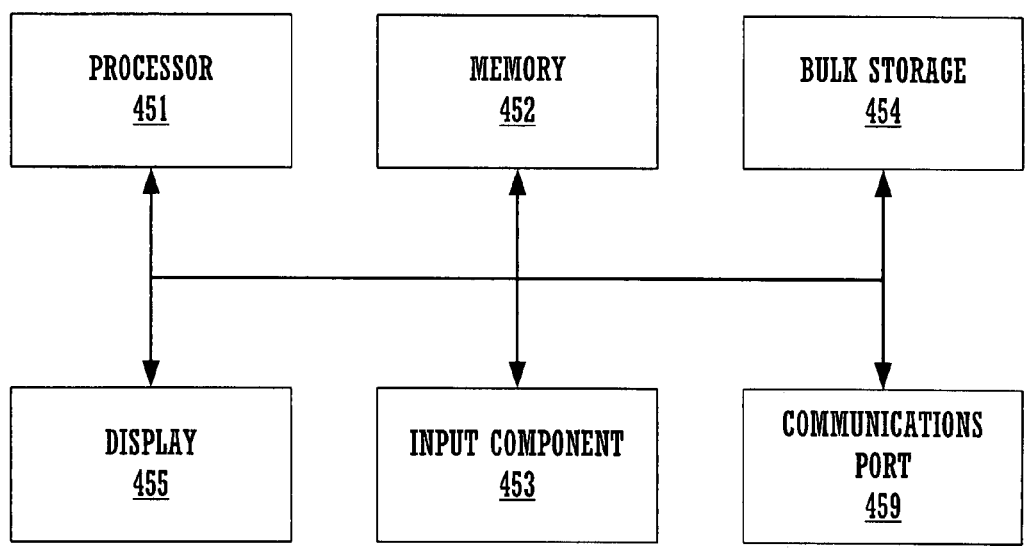
FIG. 4A is a block diagram of one embodiment of a computer system on which the present invention can be implemented.

FIG. 4A is a block diagram of a computer system 450, one embodiment of a computer system on which the present invention may be implemented. For example, computer system 450 can be utilized to implement helpset build method 100, program modules 200, and/or a directory structure 300. Computer system 450 includes communication bus 457, processor 451, memory 452, input component 453, bulk storage component 454 (e.g., a disk drive), network communication port 459 and display module 455. Communication bus 457 is coupled to central processor 451, memory 452, input component 453, bulk storage component 454, network communication port 459 and display module 455.

The components of computer system 450 cooperatively function to provide a variety of functions, including performing helpset building in accordance with the present invention. Communication bus 457 communicates information. Processor 451 processes information and instructions, including instructions for building helpsets. For example, the instructions can include helpset build program 200. Memory 452 stores information and instructions, including for instructions verifying and tracking unsolicited electronic message source identifications. Bulk storage component 454 also provides storage of information. Input component 453 facilitates communication of information to computer system 450. Display module 455 displays information to a user. Network communication port 459 provides a communication port for communicatively coupling with a network.

Figure 4B:
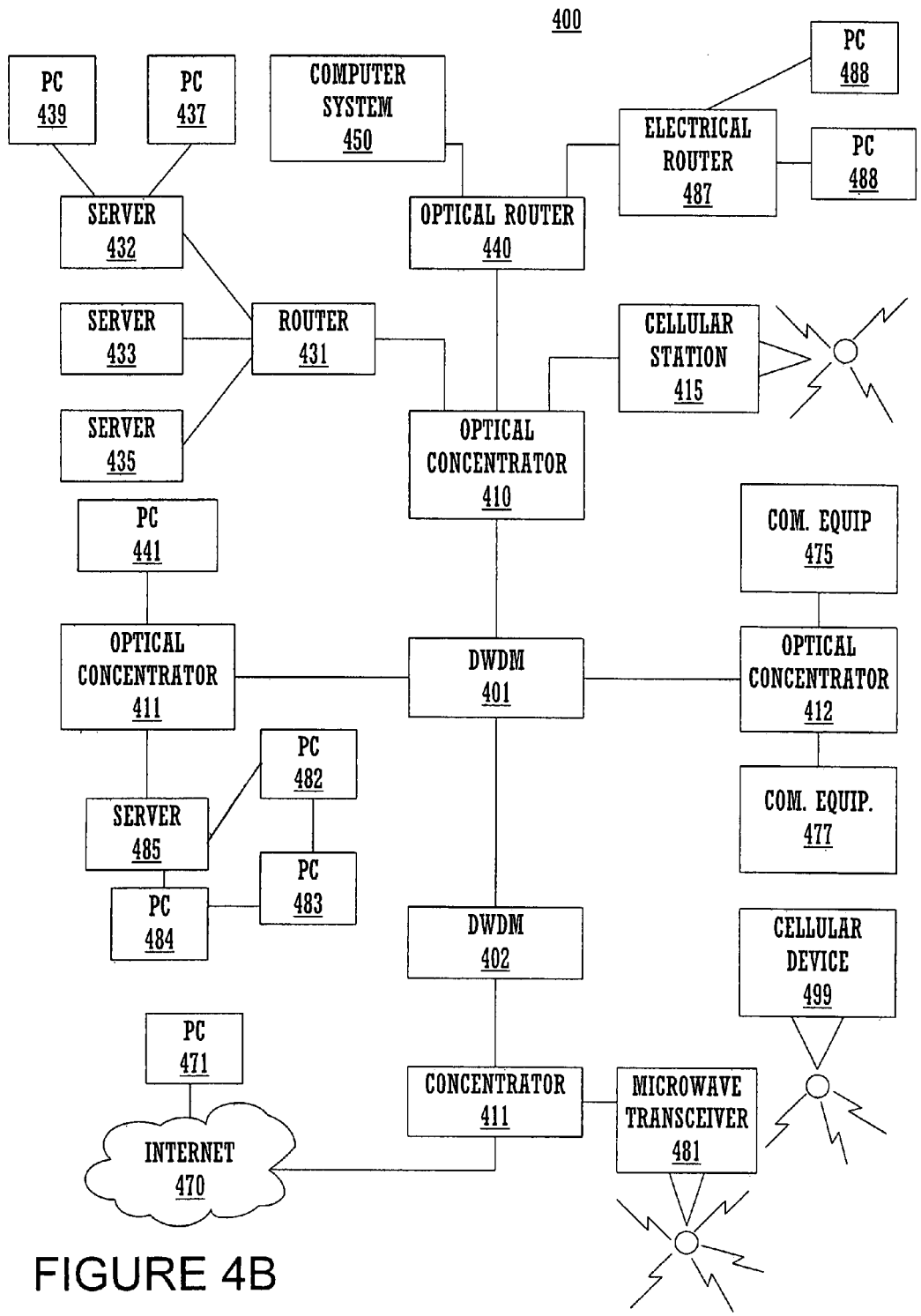
FIG. 4B is a block diagram an exemplary communication network in accordance with one embodiment of the present invention.

In one embodiment, the present invention is implemented on devices (a computer system, embedded devices, etc.) connected via a communication network. FIG. 4B is a block diagram of communication network 400, one exemplary communication network in accordance with the present invention. In one embodiment of the present invention, unsolicited e-mail authorization, source verification and tracking information are communicated via communications network 400. Communication network 400 comprises computer system 450 for implementing electronic message source verification and tracking, dense wave division multiplexer (DWDM) 401 and 402, optical concentrators 410, 411, 412 and 417, routers 431, 440 and 487, cellular station 415, cellular device (e.g., phone, handheld computer, etc.) 499, microwave transceiver 481, Internet 470, servers 485, 432, 433 and 435, personal computers 437, 439, 441, 471, 482,483,484, 488 and 489, and miscellaneous communication equipment 475 and 477. The components of communications network 400 communicate with each other over a variety of architectures utilizing numerous communication protocols. One exemplary implementation of communications network 400 utilizes Fiber Distributed Data Interface (FDDI), Dynamic Packet Transport (DPT), Packet Over Sonet (POS), Asynchronous Transfer Mode (ATM), Ethernet, token ring, Transmission Control Protocol/Internet Protocol (TCP/IP), plain old telephone system (POTS), Cable, Digital Subscriber Line (DSL), etc.

Thus the present invention facilitates helpset building. Present invention helpset build methods and systems automate various helpset building activities and functions. Helpsets are built in an efficient and coordinated manner. For example, indexes, tables of contents, mapping files and full-test-search indexes are automatically created with no or minimal manual intervention. The results are coordinated to include a variety of related helpsets (e.g., subhelpsets) and input from various authors. The present invention also facilitates minimization of duplications, unnecessary information and problems (e.g., bugs) in the output.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of building a helpset, comprising:
verifying arguments;
checking for a subhelpset indication;
copying a first plurality of files from a source directory to a temporary directory;
generating an index;
generating a map file;
generating a full-test-search index; and
copying a second plurality of files from the temporary directory to an output directory.

2. The method according to claim 1, further comprising generating a modified map file in response to tags.

3. The method according to claim 1, further comprising building one or more subhelpsets prior to building the helpset in a recursive process.

4. The method according to claim 3, wherein an output directory includes a compressed output file created after subhelpsets and helpsets have been built.

5. The method according to claim 1, wherein said second plurality of files is less than said first plurality of files.

6. The method according to claim 5, wherein said second plurality of files includes referenced files determined by a filtering process.

7. The method according to claim 1, further comprising:
generating a report;
and launching a previewer.

8. A helpset build method comprising:
preparing helpset information for building;
building helpset files and subhelpset files in an automatic recursive manner, including:
parsing gathered files,
identifying related Helpsets,
building control files automatically,
copying helpset files selectively, wherein selection is indicated by results of said parsing, modifying said help files and control files automatically; and reporting helpset status related information.

9. The helpset build method of claim 8 wherein said help files and control files are modified automatically based upon meta-tag indications.

10. The helpset build method of claim 8 wherein said reporting includes indications of peculiarities for a run.

11. A machine readable storage device storing a computer program executed by a machine, the computer program comprising several modules, each module when executed by the machine, resulting in specific functions:
   a verification module which verifies arguments;
   a recursion module which directs recursive helpset build operations;
   an index generation module which generates a keyword index;
   a map file generator module which generates a map file that maps topic identifications to file names;
   a full-test-search index generator which generates a search index; and
   a file compression module which compresses a final output helpset build product file.

12. The computer program stored on the machine readable storage device according to claim 11, further comprising a parsing module which when executed by the machine, parses information utilized in building a helpset.

13. The computer program stored on the machine readable storage device according to claim 11, further comprising a file editing module which when executed by the machine, automatically implements file editing.

14. The computer program stored on the machine readable storage device according to claim 13, wherein said file editing includes script-tag insertion and meta-tag insertion.

15. The computer program stored on the machine readable storage device according to claim 13, wherein said file editing module, when executed by the machine, directs post-processing operations.

16. The computer program stored on the machine readable storage device according to claim 15, further comprising a smart filter copying module which when executed by the machine, controls copy of files associated with helpset building.

17. The computer program stored on the machine readable storage device according to claim 16, wherein said smart filter copying module, when executed by the machine, directs selective copying of referenced image files.

18. The computer program stored on the machine readable storage device according to claim 11, wherein said recursion module directs operations to include subhelpsets in a helpset build output.

19. The computer program stored on the machine readable storage device according to claim 11, further comprising an activation module, that when executed by the machine, automatically initiates implementation of modules for helpset building.

* * * * *

UNITED STATES PATENT AND TRADEMARK OFFICE
CERTIFICATE OF CORRECTION

| | | |
|---|---|---|
| PATENT NO. | : 7,333,971 B2 | Page 1 of 1 |
| APPLICATION NO. | : 10/771655 | |
| DATED | : February 19, 2008 | |
| INVENTOR(S) | : Jedidja Lubbers and David H. Goering | |

It is certified that error appears in the above-identified patent and that said Letters Patent is hereby corrected as shown below:

Title page, item [75] in the Inventors:

Delete "Jedidia" and insert --Jedidja--

Signed and Sealed this
Third Day of July, 2012

David J. Kappos
*Director of the United States Patent and Trademark Office*